United States Patent [19]

Matyas

[11] Patent Number: 4,661,658
[45] Date of Patent: Apr. 28, 1987

[54] OFFLINE PIN VALIDATION WITH DES
[75] Inventor: Stephen M. Matyas, Kingston, N.Y.
[73] Assignee: International Business Machines Corporation, Armonk, N.Y.
[21] Appl. No.: 700,897
[22] Filed: Feb. 12, 1985
[51] Int. Cl.$^4$ .............................................. H04L 9/00
[52] U.S. Cl. ...................................... 380/23; 380/28
[58] Field of Search ............... 178/22.08, 22.09, 22.11, 178/22.10; 235/380, 382, 379

[56] References Cited

U.S. PATENT DOCUMENTS

| | | | |
|---|---|---|---|
| 4,218,738 | 8/1980 | Matyas et al. | 178/22.08 |
| 4,309,569 | 1/1982 | Merkle | 178/22.08 |
| 4,438,824 | 3/1984 | Mueller-Schloer | 178/22.11 |

OTHER PUBLICATIONS

"PIN Manual", by Interbank Card Association, 1980.

Primary Examiner—Salvatore Cangialosi
Assistant Examiner—Aaron J. Lewis
Attorney, Agent, or Firm—George E. Clark; C. Lamont Whitham

[57] ABSTRACT

A method of offline personal authentication in a multi-terminal system uses a secret user PIN, a secret key and other nonsecret data stored on a customer memory card and a nonsecret validation value stored in each terminal connected in a network. The technique of "tree authentication" is used which employs an authentication tree with an authentication tree function comprising a one-way function. An authentication parameter is calculated as a function of a personal key and a user identifier read from the user's card and the PIN entered by the user. The calculated authentication parameter is mapped to a verification value using the one-way function to the root of the authentication tree. The verification value obtained by mapping the calculated authentication parameter is then compared with a global verification value stored at the terminal. If the comparison is favorable, the system is enabled for the user; otherwise, the user is rejected.

8 Claims, 4 Drawing Figures

| INDEX POSITION | 000 | 001 | 010 | 011 | 100 | 101 | 110 | 111 | TABLE 3 |
|---|---|---|---|---|---|---|---|---|---|
| VALUE | $AP_0$ | $AP_1$ | $AP_2$ | $AP_3$ | $AP_4$ | $AP_5$ | $AP_6$ | $AP_7$ | |

| INDEX POSITION | 00 | 01 | 10 | 11 | TABLE 2 |
|---|---|---|---|---|---|
| VALUE | $AP_{0,1}$ | $AP_{2,3}$ | $AP_{4,5}$ | $AP_{6,7}$ | |

| INDEX POSITION | 0 | 1 | TABLE 1 |
|---|---|---|---|
| VALUE | $AP_{0,1,2,3}$ | $AP_{4,5,6,7}$ | |

| VALUE | • | $AP_{0,1,2,3,4,5,6,7}$ |
|---|---|---|

NOTE: INDEX POSITION IS REPRESENTED AS A BINARY NUMBER.
VALUES STORED IN TABLES 1, 2 AND 3 WHERE n = 3.

ONE-WAY FUNCTION MAPPING TWO 56-BIT VALUES TO ONE 56-BIT VALUE

| INDEX POSITION | 000 | 001 | 010 | 011 | 100 | 101 | 110 | 111 | TABLE 3 |
|---|---|---|---|---|---|---|---|---|---|
| VALUE | $AP_0$ | $AP_1$ | $AP_2$ | $AP_3$ | $AP_4$ | $AP_5$ | $AP_6$ | $AP_7$ | |

| INDEX POSITION | 00 | 01 | 10 | 11 | TABLE 2 |
|---|---|---|---|---|---|
| VALUE | $AP_{0,1}$ | $AP_{2,3}$ | $AP_{4,5}$ | $AP_{6,7}$ | |

| INDEX POSITION | 0 | 1 | TABLE 1 |
|---|---|---|---|
| VALUE | $AP_{0,1,2,3}$ | $AP_{4,5,6,7}$ | |

| VALUE | $AP_{0,1,2,3,4,5,6,7}$ |
|---|---|

NOTE: INDEX POSITION IS REPRESENTED AS A BINARY NUMBER.
VALUES STORED IN TABLES 1, 2 AND 3 WHERE n = 3.

| INDEX POSITION | 000 | 001 | 010 | 011 | 100 | 101 | 110 | 111 | TABLE 3 |
|---|---|---|---|---|---|---|---|---|---|
| VALUE | $AP_0$ | $AP_1$ | $AP_2$ | $AP_3$ | $AP_4$ | $AP_5$ | $AP_6$ | $AP_7$ | |

| INDEX POSITION | 00 | 01 | 10 | 11 | TABLE 2 |
|---|---|---|---|---|---|
| VALUE | $AP_{0,1}$ | $AP_{2,3}$ | $AP_{4,5}$ | $AP_{6,7}$ | |

| INDEX POSITION | 0 | 1 | TABLE 1 |
|---|---|---|---|
| VALUE | $AP_{0,1,2,3}$ | $AP_{4,5,6,7}$ | |

| VALUE | $AP_{0,1,2,3,4,5,6,7}$ |
|---|---|

NOTE: INDEX POSITION IS REPRESENTED AS A BINARY NUMBER

| FROM TABLE | INDEX POSITION OF VALUE SELECTED |
|---|---|
| 3 | 011 |
| 2 | 00 |
| 1 | 1 |

VALUES SELECTED FROM TABLES 1, 2 AND 3 TO BE STORED ON CUSTOMER'S MEMORY CARD FOR THE PARTICULAR CASE WHERE THE CUSTOMER'S AUTHENTICATION PARAMETER IS $AP_2$

FIG. 3

OFFLINE PIN VALIDATION WITH DES

BACKGROUND OF THE INVENTION

This invention is directed to a method of offline personal authentication involving a secret user personal identification number (PIN), a secret key and other nonsecret data stored on a customer memory card, and a nonsecret validation value stored in each terminal in a network. Typically, the terminals are connected to a bank which issues the memory card and the terminals are automated teller machines (ATM) or point of sale (POS) terminals. By memory card, what is meant is a card which stores more binary data than currently used magnetic stripe cards but is distinguished from so-called "smart" cards in that it does not incorporate a microprocessor on the card.

The problem solved by the subject invention is that of authenticating a user of a memory card for electronic funds transfer (EFT) systems or point of sale (POS) terminals. The subject invention is based on a technique of "tree authentication" first suggested by Ralph Merkle. See, for example, the following publications:

Ralph C. Merkle, *Secrecy, Authentication, and Public Key Systems*, UMI Research Press, Ann Arbor, Mich., 1982.

Ralph C. Merkle, *Secrecy, Authenication, and Public Key Systems*, Technical Report No. 1979-1, Information Systems Laboratory, Stanford University, June 1979.

Ralph C. Merkle, *Protocols for Public Key Cryptosystems*, Technical Report, BNR, Palo Alto, CA, January 1980.

Ralph C. Merkle, "Protocols for Public Key Cryptosystems," *Proceedings of the 1980 Symposium on Security and Privacy*, 122–134, Apr. 14-16, 1980).

U.S. Pat. No. 4,309,569 to Ralph C. Merkle for "Method of Providing Digital Signatures" discloses a method of providing a digital signature for purposes of authentication of a message. This method utilizes an authentication tree function or a one-way function of a secret number. More specifically, the method according to Merkle provides a digital signature of the type which generates a secret number $X_i$, where $X_i = x_{i1}, x_{i2}, x_{i3}, \ldots, x_{in}$, computes $Y_i = F(X_i)$ and transmits part of $X_i$ to the receiver as the digital signature. Merkle characterizes his invention as providing an authentication tree with an authentication tree function comprising a one-way function of $Y_i$. The root of the authentication tree and the authentication free function are authenticated at the receiver. The $Y_i$ and the corresponding authentication path values of the authentication tree are transmitted from the transmitter to the receiver. Finally, the $Y_i$ are authenticated at the receiver by computing the authentication path of the authentication tree between the $Y_i$ and the rest of the authentication tree.

The Merkle method is specifically intended to be an improvement over a public key cryptosystem proposed by Diffie et al. in "New Directions in Cryptography," *IEEE Transactions on Information Theory*, vol. IT-22, no. 6, November 1976, pages 644 to 654, as a means to implement a digital signature and authenticate the true content of a message. In the Diffie et al. scheme, to sign a message m whose size is s bits, it is necessary to compute $F(x_1) = y_1$, $F(x_2) = y_2, \ldots, F(x_s) = y_s$. The transmitter and receiver would agree on the vector $Y = y_1, y_2, \ldots, y_s$. If the jth bit of m was a 1, the transmitter would reveal $x_j$; but if the jth bit of m was a 0, the transmitter would not reveal $x_j$. In essence, each bit of m would be individually signed. To avoid the possibility of altering m by the receiver, Diffie et al. signed a new message m' that was twice as long as m and computed by concactenating m with the bitwise complement of m. This meant that each bit $m_j$ in the original message was represented by two bits, one of which would not be altered by the receiver.

A major problem of the Diffie et al. method addressed by Merkle was that it was only practical between a single pair of users. Accordingly, Merkle's approach provided a signature system of more general application and which rested on the security of a conventional cryptographic function. Moreover, Merkle's authentication tree required less storage than the Diffie et al. method. Merkle showed that n values of m bits each could be authenicated on the basis of only $m \times \log_2(n)$ bits of nonsecret information, where "$\times$" denotes multiplication. The one-way function that Merkle envisioned called for a value of m=100, although that is not significant in terms of the raw algorithm. The present invention adapts Merkle's idea of tree authentication to the area of offline EFT/POS banking.

SUMMARY OF THE INVENTION

It is therefore an object of the present invention to provide an improved offline PIN authentication technique which is particularly adapted for use in EFT-/POS terminals.

It is another object of the invention to provide an offline PIN validation technique with the data encryption standard (DES) using a memory card.

According to the invention, there is provided a method of offline personal authentication in a multi-terminal system using an improved authentication tree function comprising a one-way function. A person to be authenticated enteres his or her PIN and the memory card in a terminal in the multi-terminal system. The information read from the memory card and the PIN are used to calculate an authentication parameter. The calculated authentication parameter is then mapped to a verification value or root of the authentication tree using the one-way function. The verification value obtained by mapping the calculated authentication parameter is then compared with a global verification value stored at the terminal.

In the present invention, a secure method of tree authentication is realized with a value of m=56 with the data encryption standard (DES), i.e., by making the work factor to break the system equivalent to that of DES key exhaustion. More specifically, if $Y_1, Y_2, \ldots, Y_n$ represents n values to be authenticated by the algorithm, then the global nonsecret verification value is calculated via an algorithm that involves all of these n values. With a public key approach, once the public and private key pair has been produced, the secret key can be used to generate the appropriate quantity to store on a memory card without any dependency on the parameters stored on other memory cards. That is, if an n+1st user is to be added to the list, the public and secret key pair need not be recalculated; rather, they can be used as is to generate the appropriate quantity to be stored on that new user's memory card. But with the DES solution used in the subject invention, an n+1st user cannot be added to the list without recalculating a new global verification value.

There are ways around this problem. If a bank, for example, is willing to assign a new ID to a customer in cases when his or her PIN and bank card have been compromised, then the original list of n values to be authenticated could include 10 or 20 percent extra IDs and associated values of Y to be authenticated. In that case, when a card and PIN are compromised, the ID is invalidated and a new ID is assigned to the customer and a new PIN and card are issued using one of the precalculated values already available. The old ID is then stored in a "hot list" at each terminal, and in the course of authenticating a user at a terminal, this "hot list" is checked to make sure that the ID being used in not invalid. On the other hand, if the bank cannot assign a new ID to a customer, i.e. the ID remains fixed for the life of that customer, then there can be provided two or more sets of n values and two or more global verification values are stored in the terminal. A user would be assigned a new PIN and a new card to work off the second verification value only if the PIN and card for the first verification value have been compromised. In turn, the user could get a PIN and card to work off a third verification value if the PIN and card for the first two verification values have been compromised. Again, a "hot list" is checked to make sure that the PIN being used and a calculated authentication parameter are not invalid. Yet another possibility is to have only two sets of values, one primary and one secondary. Since there are apt to be very few customers that would be issued more than two cards, these cases could be handled on an exception basis with an authentication table at each EFT/POS terminal. The table, which might contain a few hundred entries, would consist of the user's ID and his authentication parameter, the latter of which would be calculated from the user's PIN, personal key and nonsecret data stored on the card, and the global secret key in the terminal.

The method according to the invention also requires a large amount of storage on the card to store nonsecret data required by the authentication algorithm. Roughly, if there are $2^n$ customers that require offline authentication, then each card must store $56 \times n$ bits of nonsecret data required by the authentication algorithm. The card must also store a 56 bit secret key and an n-bit number representing the "path" of the calculation. Note that the amount of data stored on the card depends on the number of customers (i.e., it is dependent on n rather than being independent of it). For example, if there are one million customers in the bank (roughly equal to $2^{20}$), then there are $56 \times 20 = 1120$ bits plus a 56-bit key plus a 20-bit "path" required to be stored on the card. However, the algorithm has the property that the number of bits on the card grows only as the $\log_2$ of the number of customers. Thus, if a bank wants to service two million customers, it is only necessary to store an additional 56 bits on the card. With a memory card having sufficient storage, the DES approach can be used almost as easily as a public key approach. The Rivest, Shamir and Adleman (RSA) public key algorithm, for example, would require a 400-bit value to be stored on the card. This is less than the 1200 or 1300 bits called for by the method according to the present invention, but is large enough to also require a memory card. In other words, the public key approach can not use the present magnetic stripe card either. The approach taken by the present invention has the advantage of offering an alternative to public key and is based on the proven strength of the DES.

BRIEF DESCRIPTION OF THE DRAWING

The foregoing and other objects, aspects and advantages of the invention will be better understood from the following detailed description of a preferred embodiment of the invention with reference to the accompanying drawings, in which:

FIG. 3 is similar to FIG. 2 but shows the manner in which values are selected from the three tables to be stored on a customer's memory card.

DETAILED DESCRIPTION OF THE INVENTION

Figures 1, 2:
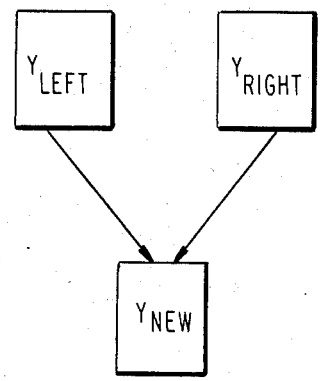
FIG. 1 is a block diagram illustrating the one-way function mapping of two 56-bit values to one 56-bit value.
FIG. 2 is a simple illustrative example of three tables of authentication parameters.

Consider first the question of PIN secrecy. Let the encrypted PIN (denoted EPIN) be calculated as in Equation 1.

$$EPIN = E_{KGb1}(E_{PIN}(ID)) \tag{1}$$

where PIN is the entered PIN, ID is the user identifier, and KGb1 is a global secret key stored in each EFT/POS terminal. Let the authentication parameter AP be calculated as in Equation 2.

$$AP = \text{Right56}[E_{KP \oplus EPIN}(ID) \oplus ID] \tag{2}$$

where KP is the user's personal key stored on the card, the symbol "$\oplus$" represents an Exclusive OR operation, and "Right56" is a function that extracts the rightmost 56 bits in the binary varible denoted by the argument of the function. Equation 2 uses EPIN instead of PIN so that the PIN cannot be derived via trial and error at electronic speeds from a lost or stolen card using the public verification value in the EFT/POS terminal. From Equation 2, it is apparent that a new PIN can be issued merely by calculating a new EPIN using Equation 1, calculating a new KP via the Equation $KP_{new} = EPIN_{new} \oplus KP_{old} \oplus EPIN_{old}$, and reissuing a new card with the new value of KP, i.e., $KP_{new}$, written on the card.

The method of tree authentication makes use of a binary tree. In a tree with $2^n$ final elements or "leaves", there are $2^n$ different "paths" from the root of the tree to each final leaf and therefore n transitions between levels. A tree with $n = 3$ is shown below:

| level 3 | X X X X X X X X |
| level 2 | X X X X |
| level 1 | X X |
| level 0 | X |

If the left branch is denoted by "0" and the right branch by "1", then the tree looks like this:

| Index Position | 000 001 010 011 100 101 110 111 |
| --- | --- |
| level 3 | 0 1 0 1 0 1 0 1 |
| level 2 | 0 1 0 1 |
| level 1 | 0 1 |
| level 0 | 0 |

The "path" followed in the tree can be represented as a string of "1's" and "0's". For example, starting from the root, if we go up to a left branch, then to a right branch, and then to a right branch again, the path is given by the number 011. If, on the other hand, we go up to a right branch, and then up to a right branch again, and then up to a left branch, the path is given by the number 110. Thus, the numbers 000, 001, ..., 111 describe the eight paths in this binary tree. It should be apparent that these path numbers also represent the index positions, in binary numbers, of the values at the highest level of the tree. The index position always starts from level zero.

Now, it is assumed that the problem to be resolved is to calculate a single non-secret verification value V from a set of n predefined authentication parameters $AP_0$, $AP_1$, $AP_2$, ..., $AP_n$. Suppose for the sake of this example that $\log_2(n)=20$, i.e., that there are $2^{20}=1,058,576$ customers. Note that one can always fill in the tree with dummy entries if need be; that is, where the number of customers is not equal to $2^i$ for some integer i. The n values of AP are mapped to a single root value using a one-way function that involves $\log_2(n)$ iterations. At the first iteration, the n=1,048,576 values are mapped to 524,288 values, the second iteration maps 524,288 values to 262,144 values, and so on until the 20th iteration maps two values to one value. Each application of the one-way function maps two 56-bit values (denoted $Y_{left}$ and $Y_{right}$) to a single 56-bit value denoted $Y_{new}$ as illustrated in FIG. 1. A suitable one-way function that maps $Y_{left}$ and $Y_{right}$ to $Y_{new}$ is given by Equation 3.

$$Right56[Y_{left} \oplus E_{Right56[Ci]}(Y_{left})] = U$$

$$Right56[Y_{right} \oplus E_U(Y_{right})] = Y_{new} \qquad (3)$$

where Ci is a 64-bit variable computed using Equation 4 given hereinafter. At the first iteration, Equation 3 is used to map $AP_0$, $AP_1$ and a unique codeword C to $Y_{new}$; i.e., $Y_{left}$ is $AP_0$ and $Y_{right}$ is $AP_1$. This output $Y_{new}$ may be denoted $AP_{0,1}$. Then, $AP_2$, $AP_3$ and a different codeword C are mapped to $AP_{2,3}$ using Equation 3, and so forth. At the second iteration, $AP_{0,1}$, $AP_{2,3}$ and yet a different codeword C are mapped to $AP_{0,1,2,3}$ using Equation 3, and so forth. The operations are fairly simple and straightforward. In all, there are n−1 calculations involving Equation 3. The final 56-bit value so produced is stored in each EFT/POS terminal and is used as a global verification value V.

In the example where $n=2^{20}$, the 1,048,576 values of AP, namely $AP_0$, $AP_1$, ..., $AP_{1,048,575}$, are stored in a table designated Table 20, in that order. The 524,288 values $AP_{0,1}$, $AP_{2,3}$, ..., $AP_{524286,524287}$, which are produced at the first iteration in that order, are stored in a table at a next level designated Table 19; the 262,144 values $AP_{0,1,2,3}$, $AP_{4,5,6,7}$, ..., $AP_{262140,262141,262142,262143}$, which are produced at the second iteration in that order, are stored in a table at a next level designated Table 18; and so on. Thus, the values in Table 20 are processed sequentially using the mapping in Equation 3 to produce the values in Table 19, the values in Table 19 are processed sequentially also using the mapping in Equation 3 to produce the values in Table 18, and so on.

In a simple example where n=3, only three tables would be required. The values $AP_0$, $AP_1$, ..., $AP_7$ would be stored in Table 3; the values $AP_{0,1}$, $AP_{2,3}$, $AP_{4,5}$, and $AP_{6,7}$ would be stored in the table at the next level, namely, Table 2; and the values $AP_{0,1,2,3}$ and $AP_{4,5,6,7}$ would be stored in the table at the next level, namely Table 1, as shown in FIG. 2.

Each customer is issued a PIN and a bank card on which is recorded a user identifier ID, a unique secret personal key KP, and other information including information that allows a verification value V to be calculated from that customer's authentication parameter AP. The customer's AP value is a function of PIN, KP, ID, and KGb1 as described above, and is calculated via Equations 1 and 2. In the example given in FIG. 2 where n=3, the other information stored on the bank card necessary to allow a verification value V to be calculated would consist of a 56-bit value selected from each of the three tables, i.e. Table 1, Table 2 and Table 3, and a 3-bit index position of the customer's AP value in Table 3.

The rule for determining which 56-bit values must be selected from Tables 1, 2 and 3 for storage on the bank card depends on the index position of AP in Table 3. If, for example, $AP_2$ is the authentication parameter to be authenicated, then the 3-bit index position equals 010 in binary, and the values $AP_3$, $AP_{0,1}$, $AP_{4,5,6,7}$, and 010, represent the necessary information that must be stored on the bank card to allow the verification value V to be calculated. Referring now to FIG. 3, there is a diagram illustrating the selected path for obtaining the root or verification value for this tree. The diagram shows the value of the index positions for Tables 1, 2 and 3 and the associated AP value at each such position in each table. Thus, for the given example, the starting index position is 010 and the value of AP is $AP_2$. The path traced through the tree is represented by the AP values enclosed in triangles whereas the AP values stored on the bank card are enclosed in rectangles. The rule for selecting the three values $AP_3$, $AP_{0,1}$, and $AP_{4,5,6,7}$ is as follows. Starting with the index position of $AP_2$, i.e. 010, the rightmost bit is inverted and this 3-bit number 011 is used as the index position of the AP value selected from Table 3. This results in selecting $AP_3$, since the index position of $AP_2$ in Table 3 is just 011. For convenience, let the value $AP_3$ selected from Table 3 be denoted by $Y_3$ where the subscript on Y is the number of the table. The number 011 is now shifted one bit to the right, thus producing 01, and the rightmost bit is again inverted, and this 2-bit number 00 is used as the index position of the AP value selected from Table 2. This results in selecting $AP_{0,1}$ since the index position of $AP_{0,1}$ in Table 2 is just 00. For convenience, let the value $AP_{0,1}$ selected from Table 2 be denoted by $Y_2$. The number 00 is now shifted one more bit to the right, thus producing 0, and the rightmost bit is again inverted, and this 1-bit number 1 is used as the index position of the AP value selected from Table 1. This results in selecting $AP_{4,5,6,7}$ since the index position of $AP_{4,5,6,7}$ in Table 1 is just 1. For convenience, let the the value $AP_{4,5,6,7}$ selected from Table 1 be denoted by $Y_1$. Thus, the values $Y_3$, $Y_2$, $Y_1$, and the index position 010 are the values which would be written on the bank card for the example where the associated AP value is $AP_2$. In the case where n=20 described above, i.e. where 1,048,576 bank cards are issued to customers, each card would have stored on it the values $Y_{20}$, $Y_{19}$, ..., $Y_1$, and a 20-bit index position in Table 20 of the AP value to be authenticated. Thus, the amount of information stored on the bank card is variable and depends on the number of customer AP values to be authenticated and therefore on the size of the authentication tree so produced.

Referring again to FIG. 3, the calculation of the verification value V from AP, $Y_3$, $Y_2$, $Y_1$, and the index position number (010 in the example) is as follows. This is the calculation performed in the EFT/POS terminal to authenticate a cardholder. The information on the card is, of course, first read into the EFT/POS terminal. If the rightmost bit of the index position is 0, then $Y_{new}$ is calculated with Equation 3 using as inputs $Y_{left}$=AP and $Y_{right}$=$Y_3$. This is the calculation performed in the present example, since the rightmost bit of 010 is 0. On the other hand, if the rightmost bit of the index position number is 1, then $Y_{new}$ is calculated with Equation 3 using as inputs $Y_{left}$=$Y_3$ and $Y_{right}$=AP; that is, the assignment of values is reversed. Now the index position number is shifted one bit to the right, which in the example illustrated in FIG. 3, produces the value 01. If the rightmost bit of this shifted number is 0, then $Y_{new}$ is calculated with Equation 3 using as inputs $Y_{left}$=$Y_{old}$ and $Y_{right}$=$Y_2$, where $Y_{old}$ is the value of $Y_{new}$ produced in the previous step. On the other hand, if the rightmost bit in the shifted number is 1, then $Y_{new}$ is calculated with Equation 3 using as inputs $Y_{left}$=$Y_2$ and $Y_{right}$=$Y_{old}$. This is the calculation performed in our present example, since the rightmost bit in the shifted number 01 is just 1. The shifted number is again shifted one bit to the right, which in the example illustrated in FIG. 3, produces the value 0. If the rightmost bit of the shifted number is 0, then $Y_{new}$ is calculated with Equation 3 using as inputs $Y_{left}$=$Y_{old}$ and $Y_{right}$=$Y_1$, where $Y_{old}$ is again the value of $Y_{new}$ produced in the previous step. This is the calculation performed in our present example, since the rightmost bit in the shifted number is 0. On the other hand, if the rightmost bit of the shifted number is 1, then $Y_{new}$ is calculated with Equation 3 using as inputs $Y_{left}$=$Y_1$ and $Y_{right}$=$Y_{old}$. Thus, the index position number stored on the card defines how each value of $Y_i$, also stored on the card, is to be used in the calculation of $Y_{new}$ using Equation 3; i.e., whether it is substituted for $Y_{left}$ or for $Y_{right}$ in Equation 3. Moreover, once this order of substitution has been determined, either AP or the value of $Y_{new}$ produced at the previous step is substituted for the other parameter $Y_{left}$ or $Y_{right}$. The value of AP is used only at the first step in the calculation of V whereas a value of $Y_{new}$ is used in all subsequent steps in the calculation of V.

The value of C in Equation 3 is derived from the index postion number stored on the bank card using the following algorithm. Let Q be a 64-bit constant and KA and KB two constant, nonsecret cryptographic keys. Q, KA and KB are stored in each EFT/POS terminal and are universal constants whose values are established by the card issuer. If $X_1, X_2, X_3, \ldots, X_m$ denotes the index position number on the card, represented in binary, then these m bits are used to calculate the following m values of C: $C_1, C_2, \ldots, C_m$, using Equation 4.

$$C_i = E_{K_i}E_{K_{i-1}} \ldots E_{K_1}(Q) \text{ for } i = 1,2,\ldots,m \quad (4)$$

where $K_m = KA$ if $X_m = 0$ $KB$ if $X_m = 1$ $K_{m-1} = KA$ if $X_{m-1} = 0$ $KB$ if $X_{m-1} = 1$ $K_1 = KA$ if $X_1 = 0$ $KB$ if $X_1 = 1$ For example, if the index position number is 10110 01101 10001 11010, then the following 20 values of C are calculated and used with Equation 3 to calculate V:

$C1 = E_{KB}(Q)$ $C2 = E_{KA}E_{KB}(Q) = E_{KA}(C1)$ $C3 = E_{KB}E_{KA}E_{KB}(Q) = E_{KB}(C2)$

.

.

.

$C19 = E_{KB}E_{KA}E_{KB} \ldots E_{KB}E_{KA}E_{KB}(Q) = E_{KB}(C18)$ $C20 = E_{KA}E_{KB}E_{KA}E_{KB} \ldots E_{KB}E_{KA}E_{KB}(Q) = E_{KA}(C19)$ Twenty encryptions are required to calculate the 20 values of C for a particular 20-bit index position number. $C_{20}$ is used with Equation 3 to make the transition from level 20 to level 19 in the tree, $C_{19}$ is used with Equation 3 to make the transition from level 19 to level 18 in the tree, and so forth, there being a different value of C used at each fork in the tree. The reason for using different values of C is because of security. If a constant value of C were used at each fork in the tree, then an adversary could launch a birthday type of attack in which a set of $Y_{new}$ values is calculated by chaining one value after the other until there is a match with one of the actual $Y_{new}$ values in the tree. By opening several accounts, an adversary could collect a fairly large set of such actual values and thus reduce his work factor by using the mentioned attack. However, by forcing different values of C, the attack is thwarted.

For the authentication step at the EFT/POS terminal, assume that the information on the bank card is as follows:

| ID | User Identifier | |
|---|---|---|
| KP | Secret Personal Key | 56 bits |
| IPN | Nonsecret Index Position No. | 20 bits |
| $Y_{20}, Y_{19}, \ldots, Y_1$ | Nonsecret Data to Calculate Y | 1120 bits |
| VS | Verification Selection Number | |

The difference between secret and nonsecret with regard to card data refers to how that data is treated when it resides somewhere off the card. By definition, the card must be protected if any data stored on the card is defined as secret. Other nonsecret data on the card receives the same degree of protection as the secret data. It may be desirable to store a number of verification values and a positive file of AP values in each EFT/POS terminal and to authenticate a card-holder using one of these verification values which is selected on the basis of a verification selection number stored on the card-holder's card or to authenticate the cardholder on the basis of a positive file of AP values. To account for the possibility that some customers will lose their cards or a compromise of either their card or PIN may occur, which will require a new card with a new AP value to be reissued to the card-holder, it may be desirable to authenticate an AP value associated with a reissued card on the basis of a different verification value V. Each EFT/POS terminal therefore stores a value T, which is interpreted as follows. If the verification selection number VS is less than or equal to T, then the value of VS is used by the terminal to select the verification value V to be used to authenticate the cardholder's AP value.

Assume that the EFT/POS terminal stores the following:

| | | |
|---|---|---|
| Q | Nonsecret Constant | 64 bits |
| KA | Nonsecret Cryptographic Key | 56 bits |
| KB | Nonsecret Cryptographic Key | 56 bits |
| V | Verification Value | 56 bits |
| KGb1 | Secret Global Cryptographic Key | 56 bits |
| T | Number of Verification Values Stored in Terminal | |

It should be noted that there may be multiple verification values depending on the particular implementation.

Figure 4:
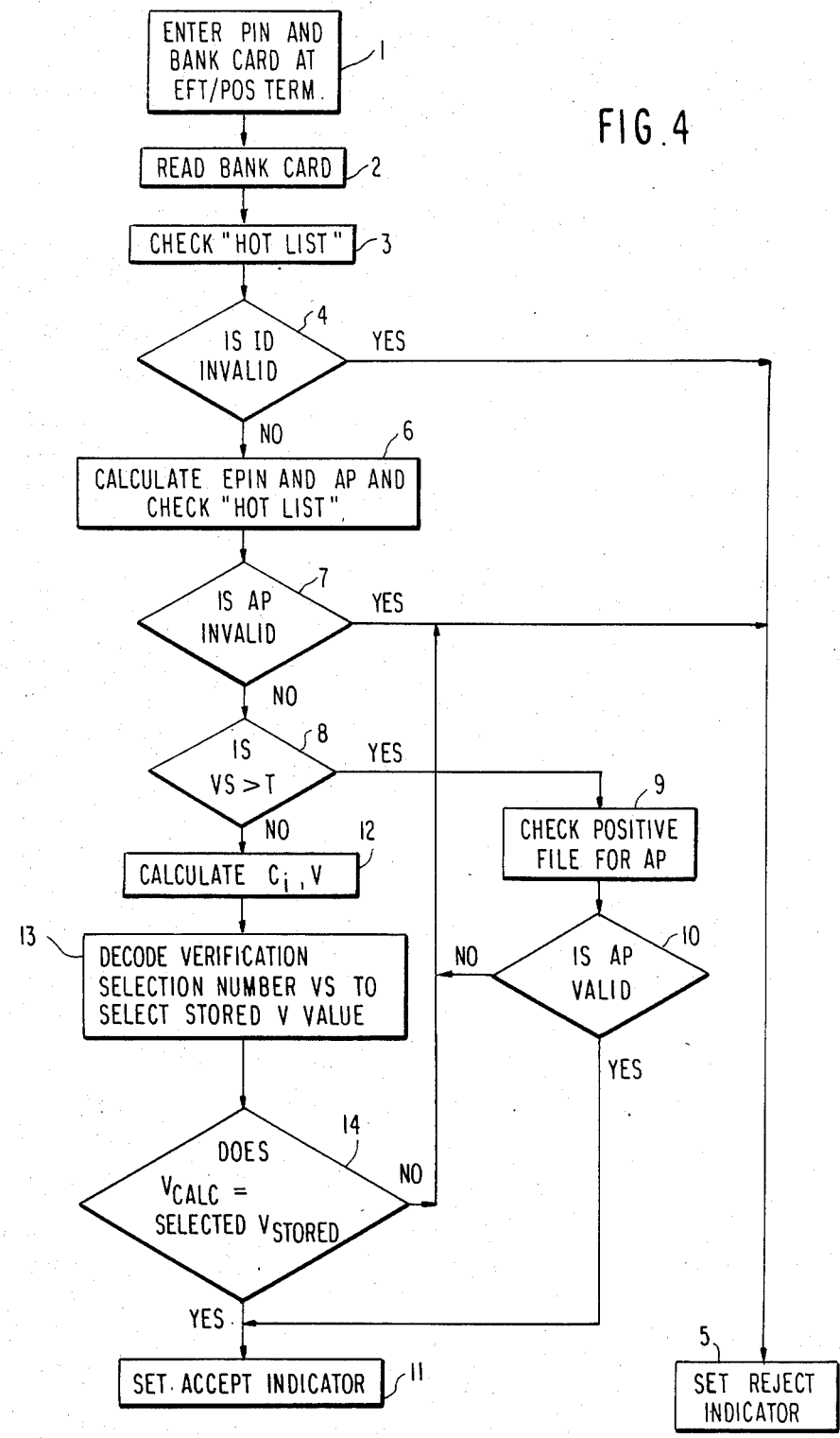
FIG. 4 is a flow diagram illustrating the operation of the offline PIN validation according to the invention.

The steps involved in the authentication process are illustrated in FIG. 4. First, the card-holder enters his or her PIN into the EFT/POS terminal. The card-holder also submits his or her bank card to the EFT/POS terminal as depicted in block 1. Then, in block 2, the terminal reads the quantities stored on the card. Before proceding with any calculations, a "hot list" is checked in block 3 to determine if the ID read from the card is invalid. In decision block 4, a determination is made as to whether the ID is valid, and if it is not, then the reject indicator is set in block 5. An ID is invalid if a value equal to the value of the ID is found in the "hot list". Otherwise, the process continues to block 6. At this point, the EPIN is calculated from the ID, PIN and secret KGb1 key using Equation 1. In addition AP is calculated from EPIN, KP and ID using Equation 2. A "hot list", which may be the same "hot list" mentioned above, is also checked to determine if the AP is invalid. The AP is invalid if a value equal to the value of AP is found in the "hot list". If the AP is invalid, then the reject indicator is set in block 5. Otherwise, the process continues to decision block 8 where a determination is made as to whether the verification selection number VS is greater than the value of T stored in the EFT/POS terminal. If it is, then the card-holder is authenticated on the basis of a positive file in block 9 instead of on the basis of a verification value V. Such a file can be implemented by storing in the positive file the values of ID and AP for each such user to be authenticated by the positive file. In decision block 10, a determination is made as to whether a positive authentication is made from the file, and if not, then a reject indicator is set in block 5. More particularly, the card-holder's ID is first used to access and obtain a corresponding AP value stored in the positive film, and the cardholder is then authenticated by comparing this AP of reference value for equality with the AP value calculated in block 6.

Returning to block 8, if the verification selection number is less than or equal to T, then the constants $C_1$, $C_2$, ..., $C_{20}$ are calculated, in that order using Equation 4, from Q, KA, KB, and the index position number (IPN) read from the card, and these generated quantities are stored in a table and later accessed when calculating V. Once the constants $C_i$ have all been calculated, V is calculated from AP, $Y_{20}$, $Y_{19}$, ..., $Y_1$, $C_{20}$, $C_{19}$, ..., $C_1$, and the 20-bit index position number, represented by IPN=$X_1$, $X_2$, ..., $X_{20}$, using Equation 3 repeatedly, as follows:

$$\text{Right56}[Y_{left} \oplus E_{\text{Right56}[C_{20}]}(Y_{left})] = U_{20}$$

$$\text{Right56}[Y_{right} \oplus E_{U_{20}}(Y_{right})] = Y_{new19}$$

where $Y_{left} = AP$ and $Y_{right} = Y_{20}$ if $X_{20} = 0$ or $Y_{left} = Y_{20}$ and $Y_{right} = AP$ if $X_{20} = 1$ $$\text{Right56}[Y_{left} \oplus E_{\text{Right56}[C_{19}]}(Y_{left})] = U_{19}$$

$$\text{Right56}[Y_{right} \oplus E_{U_{19}}(Y_{right})] = Y_{new18}$$

where $Y_{left} = Y_{new19}$ and $Y_{right} = Y_{19}$ if $X_{19} = 0$ or $Y_{left} = Y_{19}$ and $Y_{right} = Y_{new19}$ if $X_{19} = 1$ $$\text{Right56}[Y_{left} \oplus E_{\text{Right56}[C_{18}]}(Y_{left})] = U_{18}$$

$$\text{Right56}[Y_{right} \oplus E_{U_{18}}(Y_{right})] = Y_{new17}$$

where $Y_{left} = Y_{new18}$ and $Y_{right} = Y_{18}$ if $X_{18} = 0$ or $Y_{left} = Y_{18}$ and $Y_{right} = Y_{new18}$ if $X_{18} = 1$

.
.
.

$$\text{Right56}[Y_{left} \oplus E_{\text{Right56}[C_1]}(Y_{left})] = U_1$$

$$\text{Right56}[Y_{right} \oplus E_{U_1}(Y_{right})] = V$$

where $Y_{left} = Y_{new1}$ and $Y_{right} = Y_1$ if $X_1 = 0$ or $Y_{left} = Y_1$ and $Y_{right} = Y_{new1}$ if $X_1 = 1$ The foregoing calculations are made in block 12. The verification selection number is decoded at block 13 to select a particular one of the T global reference values stored at the terminal. Then in decision block 14 a determination is made as to whether the calculated value of V is equal to the particular selected global reference value stored in the terminal. If it is not, then the reject indicator is set in block 5. Otherwise, the accept indicator is set in block 11.

Returning briefly to decision block 13, by way of example, let T=2. Then if the verification selection number is 1, a first global reference value is used in making the determination to authenticate the user. However, if the verification selection number is 2, then a second global reference value is used. As already described with reference to decision block 8, if the verification selection number is greater than 2, the user is authenticated on the basis of a positive file in block 9. Obviously, the numbers chosen here are governed by practical considerations, and those skilled in the art will recognize that modifications can be made without departing from the spirit of the invention.

Summarizing, the method according to the present invention has the following security properties: First, compromising a card does not compromise the PIN. Second, compromising the global secret key does not compromize the PIN nor does it allow someone to forge cards and defraud the system. The process of personal authentication is based on a nonsecret global value stored in each EFT/POS terminal. Added PIN protection is achieved through the use of the global secret key also stored in each EFT/POS terminal. Compromising this key does not by itself compromise PINs. The justification for employing a global secret key is that with short PINs, there is no way to maintain PIN secrecy if a user's card is compromised and the EFT/POS terminal stores only nonsecret quantities. Although a global secret key has a decided disadvantage, it is better to employ such a key when there is no other alternative to strengthen PIN secrecy, especially when it can be anticipated that many user cards will be lost and thus fall into the hands of potential adversaries. As long as the integrity of the global nonsecret verification value in the EFT/POS terminal is maintained, there is no global attack against the system. Even if the integrity of a terminal is compromised, then only that one terminal can be attacked. Since the global secret key does not lead to a global attack against the system, there is less motivation for an opponent to go after it.

As described, a "hot list" is required with the procedure according to the invention. This is no different than what would be required with a public key solution or with a DES solution involving only a global secret key for user authentication. The "hot list" is needed because the bank has to have a way to invalidate an account. For example, an opponent could open an account under a phony name and then proceed to duplicate his card and sell the cards and PINs for profit.

A user's PIN can be changed, but this involves reissuing the customer's bank card. Basically, when the PIN is changed, compensating changes must be made on the bank card which involves recalculation of an offset or certain nonsecret parameters on the card. If a user's card and PIN have been compromised, then a new card and PIN must be issued. In this case, an entry on the "Hot List" must be made to effectively invalidate the authentication information stored on that card and the user's PIN. This does not necessarily mean that the ID is invalidated. The method is such that a customer's assigned ID can remain the same even if a new card and PIN are issued, although it is more efficient if a new ID is issued.

While the invention has been described in terms of a preferred embodiment in the environment of a banking multi-terminal network, those skilled in the art will recognize that the principles of the invention can be practiced in other environments where it is desired to provide for the offline personal authentication of users of a system. For example, the invention could be used in a security system that would allow access to secure areas only to users of the system who are properly authenticated at a terminal. The important feature of the invention is the use of an authentication tree with an authentication tree function comprising a one-way function.

I claim:

1. In a multi-terminal system, a method of offline personal authentication using an authentication tree with an authentication tree function comprising a one-way function, said method employing memory cards issued to users of the system and each user being issued a personal identification number, each of said memory cards having stored thereon a personal key and an index position number representing the tree path for the user to which the card is issued, said method comprising the steps of:

calculating an authentication parameter as a function of a personal key read from a user's card, a personal identification number entered by a user at a terminal being used, and a global secret key stored in the terminal being used, said global secret key being a common secret key stored at every terminal said calculating an authentication parameter step further comprising the steps of:

calculating an encrypted personal identification number (PIN), denoted EPIN, by the equation $$EPIN = E_{KGb1}(E_{PIN}(ID)),$$

where KGb1 is a global secret key stored in each terminal and ID is a user identifier, and calculating an authentication parameter AP by the equation $$AP = \text{RightN}[E_{KP \oplus EPIN}(ID) \oplus ID],$$

where the symbol $\oplus$ is the Exclusive OR operation and "RightN" is a function that extracts the rightmost N bits in the binary variable denoted by the argument of the function, wherein said binary variable is greater than N bits mapping the calculated authentication parameter to a verification value using said index position number in said one-way function to the root of said authentication tree, comparing the verification value obtained by mapping the calculated authentication parameter with a global verification value of reference stored at the terminal, said global verification value being a common verification value stored at every terminal and enabling said system if the comparison of the versification value obtained by mapping with the global verification value of reference is favorable.

2. A method according to claim 1 wherein N equals 56.

3. The method of offline personal authentication as recited in claim 1 wherein the step of mapping is performed by first calculating a different codeword for each node of said authentication tree and then using the different codewords at the iteration of each node.

4. The method of offline personal authentication as recited in claim 2 further comprising the step of storing in each terminal values of Q, an m-bit constant, and KA and KB, two nonsecret cryptographic keys, the calculation of a different codeword for each node being a function of Q, KA and KB and said index position number stored on the user's card.

5. The method of offline personal authentication as recited in claim 1 wherein there is further stored on the card m values $Y_1, Y_2, \ldots, Y_m$ to be authenticated and the step of mapping is performed by the step of calculating said verification value V from AP, said m values and said tree function by the equation $$\text{Right56}[Y_{left} \oplus E_{Right56[C_i]}(Y_{left})] = U$$

$$\text{Right56}[Y_{right} \oplus E_U(Y_{right})] = Y_{new},$$

where $Y_{left}$ and $Y_{right}$ are two values in said tree path and $C_i$ are different values of said codeword calculated for each iteration at each node of the tree function and the last $Y_{new}$ in the iteration is said verification value V.

6. The method of offline personal authentication as recited in claim 5 wherein the values of Ci are calculated by the equation $$C_i = E_{K_i} E_{K_{i-1}} \ldots E_{K_1}(Q) \text{ for } i = 1, 2, \ldots, m$$

where $K_i=KA$ if $X_i=0$ and $K_i=KB$ if $X_i=1$ and $X_1$, $X_2, X_3, \ldots, X_m$ denote binary bits stored on the user's card which represent said index position number.

7. The method of offline personal authentication as recited in claim 1 wherein said user identifier ID is additionally stored on the user's card, said method further comprising the step of checking the user identifier ID read from the user's card against a list to determine if the ID is invalid, and if it is, rejecting the user.

8. The method of offline personal authentication as recited in claim 7 wherein after calculating the authentication parameter AP, performing the steps of checking a list to determine if the authentication parameter is invalid and, if it is, rejecting the user.

* * * * *